US006244797B1

(12) United States Patent
Wheeler

(10) Patent No.: US 6,244,797 B1
(45) Date of Patent: Jun. 12, 2001

(54) ROUTER KEYLESS CHUCK

(75) Inventor: Dale K. Wheeler, Fallston, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/427,604

(22) Filed: Oct. 27, 1999

(51) Int. Cl.$^7$ .............................. B23C 1/20; B23B 31/22
(52) U.S. Cl. .................. 409/182; 144/136.95; 279/50
(58) Field of Search .................................. 409/181, 182; 144/136.95; 279/50, 54, 57, 74, 75, 134, 135, 142; 408/239 R, 240

(56) References Cited

U.S. PATENT DOCUMENTS

| 3,587,387 | * | 6/1971 | Burrows et al. | 409/112 |
|---|---|---|---|---|
| 3,674,281 | * | 7/1972 | Hedrick | 279/30 |
| 3,802,713 | * | 4/1974 | Levy | 279/50 |
| 4,049,282 | * | 9/1977 | Yearsley | 279/50 |
| 4,493,645 | * | 1/1985 | Nakanishi | 433/127 |
| 4,736,742 | * | 4/1988 | Alexson et al. | 606/80 |
| 5,810,366 | * | 9/1998 | Montjoy et al. | 279/43 |
| 5,921,730 | * | 7/1999 | Yung et al. | 409/182 |
| 5,988,957 | * | 11/1999 | Wheeler | 408/239 R |

* cited by examiner

Primary Examiner—William Briggs
(74) Attorney, Agent, or Firm—Harness, Dickey & Pierce, P.L.C.

(57) ABSTRACT

A router includes a tool holder which has a spindle with a bore to receive a router tool bit. A sleeve surrounds the spindle. A locking mechanism retains the router bit in the bore. The locking mechanism includes at least one rolling member in contact with the sleeve and which extends into the bore. The rolling member locks the router bit in the tool holder. A biasing member retains the sleeve in a locked position. The locking mechanism includes an activation member remotely positioned from the sleeve for moving the sleeve between the locked and unlocked position.

18 Claims, 4 Drawing Sheets

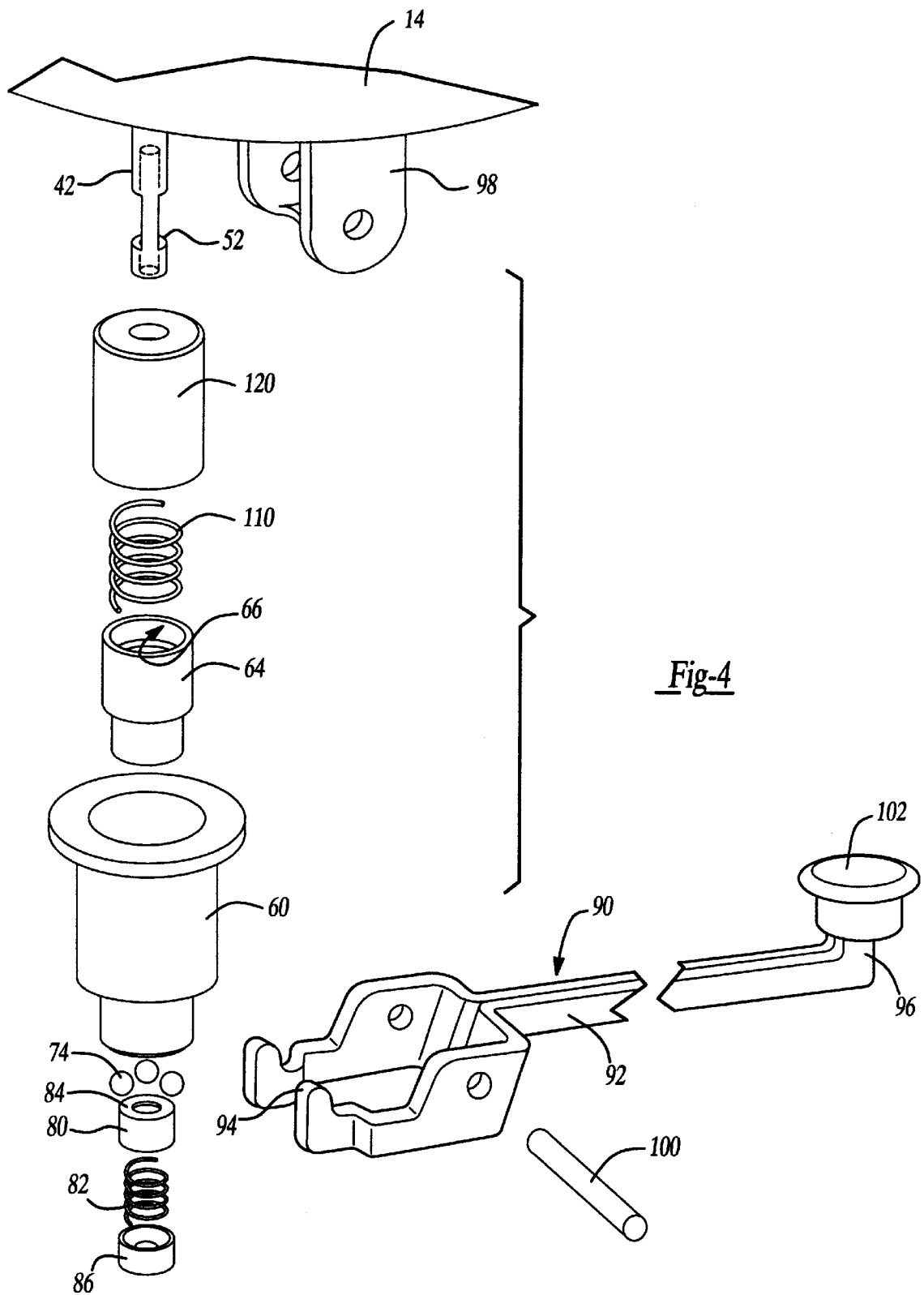

ROUTER KEYLESS CHUCK

BACKGROUND AND SUMMARY OF THE INVENTION

The present invention relates to power tools and, more particularly, to router tool bit holders.

Routers are utilized by tradesmen, craftsman, hobbyists and the like to perform intricate cutting projects. Routers have been utilized to form grooved areas in woodworking as well as to remove excess material on edges of workpieces. Thus, routers utilize various types of cuffing tools in order to make various cuts in a particular material. In order to utilize a different tool bit, the tool bit must be removed from the router tool holder.

Ordinarily, to remove a tool bit from a router tool holder, various types of wrenches must be used. Since, during cutting, the router tool holder heats up, the user must be careful when removing the tool bits. As such, the user must keep a careful eye on his wrenches so that they are readily available when the tool bits need to be changed. Thus, it would be desirable to have a tool holder which eliminated the need for wrenches to remove the router tool bit.

The present invention provides the art with a router tool holder which eliminates the need for wrenches to remove the tool bit from the tool holder. The present invention provides the art with a keyless router tool holder which enables an actuator to be actuated which, in turn, enables quick removal of the cutting tool from the router to ol holder.

In accordance with a first aspect of the invention, a router tool holder comprises a spindle adapted for coupling with a motor. A bore is formed in the spindle to receive a router tool bit. A sleeve surrounds the spindle. A locking mechanism is coupled with the sleeve to retain a router bit in the bore. The locking mechanism includes at least one rolling member in contact with the sleeve and extending into the bore. The rolling member locks the router bit in the tool holder. A biasing member moves the rolling member between a locked and unlocked position. The biasing member includes an activation member remotely positioned from the sleeve to move the rolling member between the locked and unlocked position. The biasing member includes a helical spring surrounding the spindle. A second sleeve surrounds the spring and is coupled with the spring to compress the spring. The second sleeve contacts the rolling member and is coupled with the activation member to move the second sleeve between the locked and unlocked position. A stop member is coupled to the spindle to contact the helical spring, such that the helical spring compresses and expands between the stop member and the second sleeve. The actuation member includes a lever pivoting about a pivot point. One of the ends of the lever is coupled with the second sleeve for moving the second sleeve between the locked and unlocked position. The other end of the lever includes a handle portion to enable movement of the lever. The handle portion is positioned a desired distance away from the sleeve so that the handle is removed such that its temperature is not increased during use. The lever has a desired length which enables a substantially strong spring to be used to retain the router bit in the tool holder. The locking member includes a plurality of rolling members while the second sleeve has a member to register the plurality of roller members within the tool holder.

According to a second aspect of the invention, a router comprises a housing with a motor in the housing. The motor includes an output. Also, a base member which includes a support system coupled with the housing to support the housing. The housing is movable on the support system towards and away from the base. A tool holder is coupled with the motor output. The tool holder includes a spindle adapted for coupling with a motor. A bore is formed in the spindle to receive a router tool bit. A sleeve surrounds the spindle. A locking mechanism is coupled with the sleeve to retain a router bit in the bore. The locking mechanism includes at least one rolling member in contact with the sleeve and extending into the bore. The rolling member locks the bit in the tool holder. A biasing member moves the rolling member between a locked and unlocked position. The biasing member includes an activation member remotely positioned from the sleeve to move the rolling member between the locked and unlocked position. The biasing member includes a helical spring surrounding the spindle. A second sleeve surrounds the spring and is coupled with the spring to compress the spring. The second sleeve contacts the rolling member and is coupled with the activation member to move the second sleeve between the locked and unlocked position. A stop member is coupled to the spindle to contact the helical spring, such that the helical spring compresses and expands between the stop member and the second sleeve. The actuation member includes a lever pivoting about a pivot point. One of the ends of the lever is coupled with the second sleeve to move the second sleeve between the locked and unlocked position. The other end of the lever includes a handle portion to enable movement of the lever. The handle portion is positioned a desired distance away from the sleeve so that the handle is removed such that its temperature is not increased during use. Also, the lever has a desired length which enables a substantially strong spring to be used to retain the router bit in the tool holder. Also, the locking member includes a plurality of rolling members while the second sleeve has a member to register the plurality of roller members within the tool holder.

In accordance with a third aspect of the invention, a router tool holder comprises a spindle adapted for coupling with a motor. A bore is formed in the spindle to receive a router tool bit. A sleeve surrounds the spindle. A locking mechanism is coupled with the sleeve to retain a router bit in the bore. The locking mechanism includes at least one rolling member in contact with the sleeve and extending into the bore. The rolling member locks the bit in the tool holder. A biasing member moves the rolling member between a locked and unlocked position. The biasing member includes an activation member remotely positioned from the sleeve to move the rolling member between the locked and unlocked position. The biasing member includes a helical spring surrounding the spindle. A second sleeve surrounds the spring and is coupled with the spring to compress the spring. The second sleeve contacts the rolling member and is coupled with the activation member to move the second sleeve between the locked and unlocked position. A stop member is coupled to the spindle to contact the helical spring, such that the helical spring compresses and expands between the stop member and the second sleeve. The actuation member includes a lever pivoting about a pivot point. One of the ends of the lever is coupled with the second sleeve to move the second sleeve between the locked and unlocked position. The other end of the lever includes a handle portion to enable movement of the lever. The handle portion is positioned a desired distance away from the sleeve so that the handle is removed such that its temperature is not increased during use. Also, the lever has a desired length which enables a substantially strong spring to be used to retain the router bit in the tool holder. A liner is positioned within the bore of the tool holder for contacting the router tool bit. Also, the locking member includes a plurality of rolling members while the second sleeve has a member to register the plurality of roller members within the tool holder.

Additional objects and advantages of the present invention will become apparent from the detailed description of the preferred embodiment, and the appended claims and accompanying drawings, or may be learned by practice of the invention.

BRIEF DESCRIPTION OF THE DRAWINGS

FIG. 4 is an enlarged exploded perspective view of the tool holder of FIG. 1.

DETAILED DESCRIPTION OF THE PREFERRED EMBODIMENT

Figure 1:
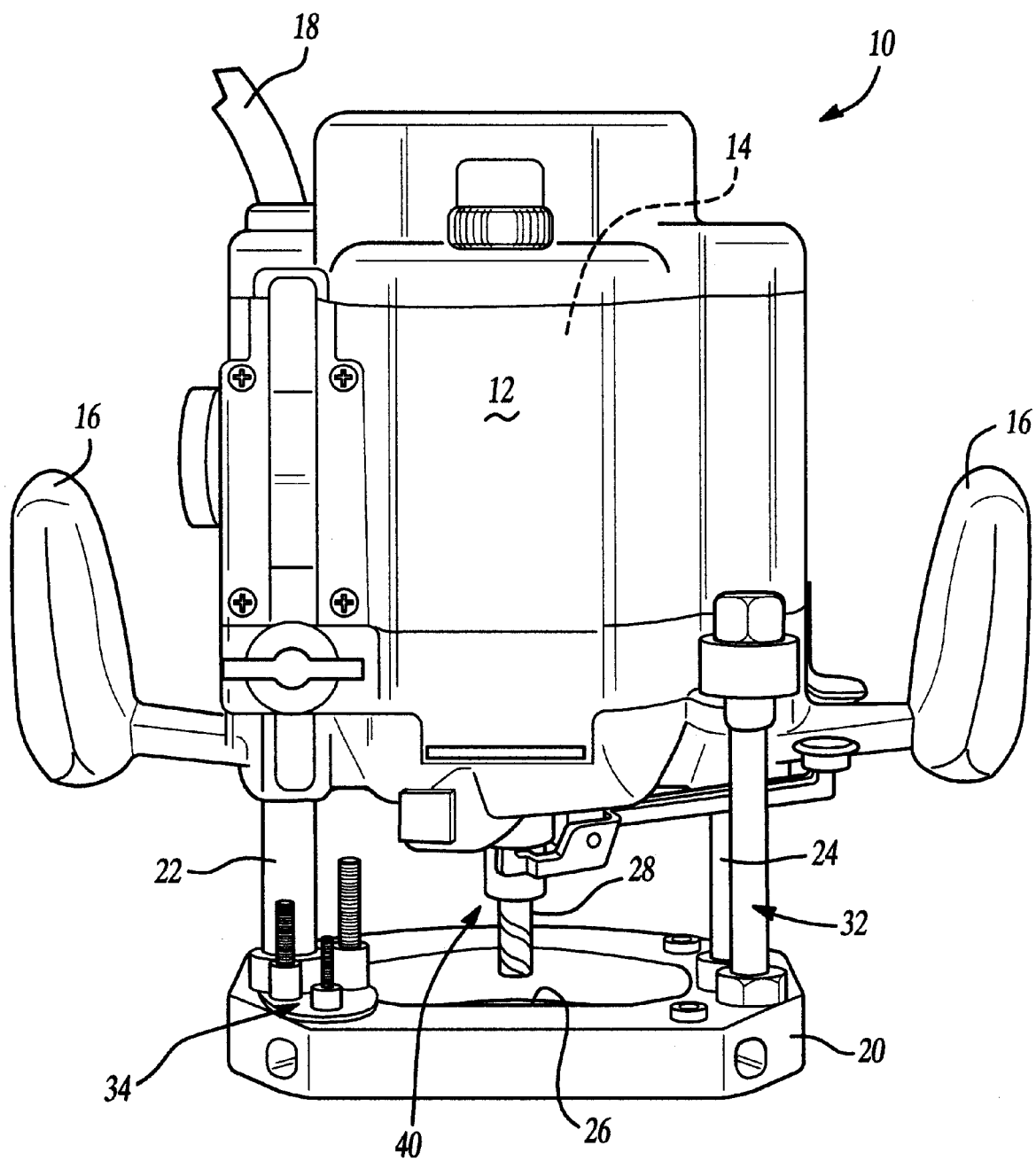
FIG. 1 is a perspective view of a router including the tool holder in accordance with the present invention.

Turning to the figures, particularly FIG. 1, a router is illustrated and designated with the reference numeral 10. The router includes a housing 12 which surrounds a motor 14. A pair of handles 16 extend from the router housing 12. A power source, such as a power cord 18, is coupled with the motor 14. A base 20 including a pair of supports 22 and 24 movably supports the motor housing 12. The motor housing 12 may move up and down along the supports 22 and 24. The base 20 includes an aperture 26 which enables the cutting tool 28 to extend through the base aperture 26 to cut a workpiece.

Also, a depth adjustment rod 32 is mounted on the housing 12. A rotary plate 34 is mounted on the upper surface of the base 20. The rotary plate has several depth stops, which are set to different heights, and which cooperate with the depth adjustment rod 32 so that the operator can allow the housing 12 to be lowered to a preselected depth. The router 10 also includes a tool holder 40. The tool holder 40 is coupled to the motor 14 either utilizing the motor spindle directly or utilizing a coupling mechanism to couple the tool holder with the motor 14.

Figure 2:
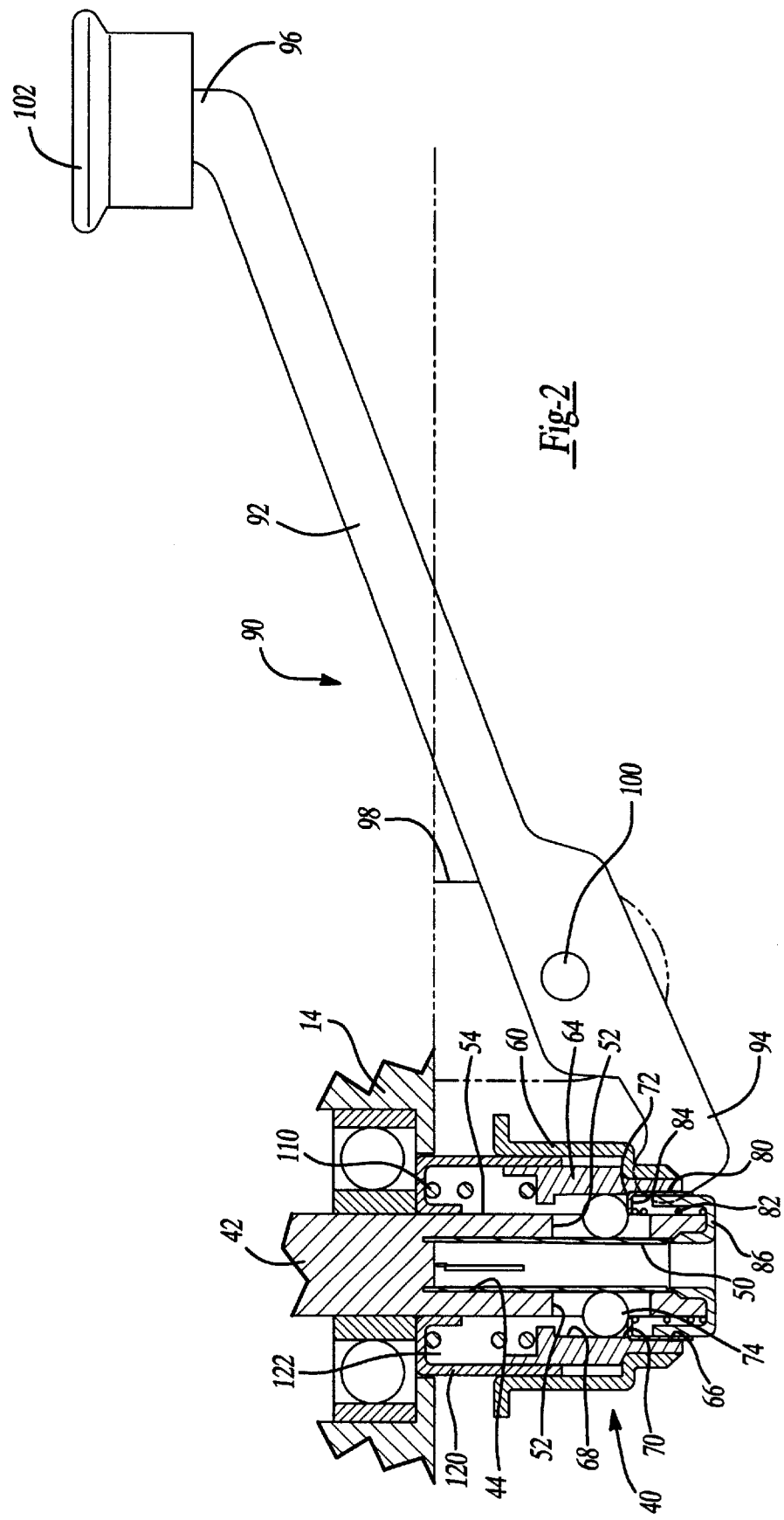
FIG. 2 is a partial cross-section view of the tool holder of FIG. 1 in a locked position.
Figure 3:
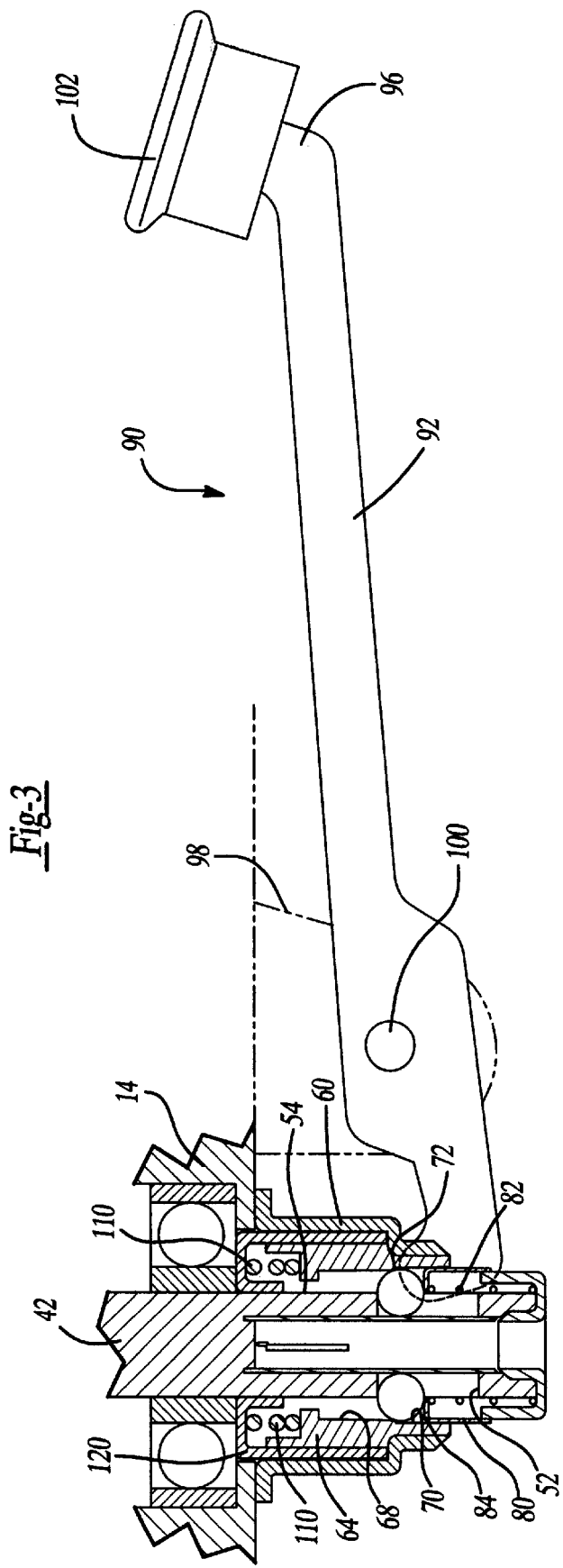
FIG. 3 is a view like FIG. 2 in an unlocked or release position.

The tool holder 40 includes a spindle 42 which may be coupled directly or indirectly to the motor 14 or be a part of the motor output (See FIGS. 2–4). The spindle 42 includes a bore 44 to receive a cutting tool bit 28. Also, a liner 50 may be positioned within the bore 44 to receive the cutting tool. A plurality of apertures 52 are formed in the spindle 42 enabling access from the external surface 54 of the spindle into the bore 44.

A sleeve 60 surrounds the spindle 42. The sleeve 60 may include a bushing 64 positioned within the sleeve 60. The bushing 64 includes a cylindrical bore 66 having a first portion 68 and a second larger diameter portion 70. A shoulder 72 is formed between the two bore portions. The bore portion 68 may be angled inwardly at a desired angle.

Rolling members 74 are positioned within apertures 52 of the spindle 42. The rolling members 74 lock the cutting tool within the bore 44. The rolling member 74, shown as balls, are positioned in the cylindrical portions 70 and 68. The balls 74 move from in contact with the cylindrical portion 70, where the tool may be withdrawn from the bore 44, in contact with the cylindrical portion 68 where the balls lock the tool within the bore 44.

A second sleeve 80 surrounds the spindle 42. The second sleeve 80 surrounds a helical spring 82 which is positioned between a flange 84 on the sleeve 80 and a stop member 86. The spring 82 biases the rolling member 74 into a registered position such that all of the balls are in the same plane.

The stop 86 includes a circumferential flange 88 so that the spring is surrounded by both the stop and the second sleeve.

An activation member 90 moves the second sleeve 80 between a first and second position. In a first position as shown in FIG. 2, the balls are in contact with the cylindrical surface 68 which, in turn, locks the cutting tool within the bore 44. In the second position shown in FIG. 3, the balls 74 are in contact with the cylindrical surface 70 which enables the cutting tool to be removed from the router tool holder. The actuating member 90 includes a lever 92 which has a first end 94 and a second end 96. The first end 92 is coupled with the second sleeve 80. A pivot 98, which includes pivot pin 100, pivotally mounts the lever 90 with the tool housing 14. The second end 96 includes a handle portion 102 which enables activation of the lever.

As can be seen in FIGS. 2 and 3, the lever pivots about pivot pin 1 00, which, in turn, moves the second sleeve 80 between the first and second positions. The handle portion 102 is remotely positioned from the tool holding bore 44. Thus, due to the desired length of the lever 92, the handle portion does not exhibit any increased heat from the rotating tool while it is cutting a workpiece. Thus, when a user desires to withdraw the cutting tool, the handle portion is pulled downward, which in turn enables the tool to either drop out or be manipulated to be removed by the user.

Spring 110 is positioned between the router housing 14 and the bushing 64. The spring 110, in an expanded position in FIG. 2, biases the bushing 64 downward towards the end of the spindle. This position, in turn, positions the rolling members 74 into the cylindrical bore 68. Accordingly, a force is applied onto the tool bit within the bore 44. As the handle portion 102 is moved downward, the sleeve 60 is moved in the opposite direction (See FIG. 3), compressing spring 110. As this occurs, rolling members 74 move into bore 70 enabling removal of the tool bit. An additional sleeve 120 is positioned in a gap 122 between the bushing 64 and the outer sleeve 60. The second sleeve 120 serves as a stop, against the housing, for the spring 110 as well as to prohibit dust or the like from entering into the tool holder.

The liner 50 is like that described in pending U.S. patent application Ser. No. 09/365,954 filed Aug. 2, 1999, the specification and drawings of which are expressly incorporated herein by reference.

While the above detailed description describes the preferred embodiment of the present invention, the invention is susceptible to modification, variation, and alteration without deviating from the scope and fair meaning of the subjoined claims.

What is claimed is:

1. A router tool holder, comprising:
   a spindle adapted for coupling with a motor;
   a bore in said spindle for receiving a router bit;
   a sleeve surrounding said spindle;
   a locking mechanism for retaining the router bit in said bore, said locking mechanism including at least one rolling member in contact with said sleeve and extending into said bore, said rolling member locking the bit in said tool holder, a biasing member for moving said sleeve between a locked and unlocked position, and an activation member remotely positioned from said sleeve for moving said sleeve between said locked and unlocked positions, said activation member including a lever, said lever having an end in contact with said sleeve, said lever end spaced from a pivot such that said lever end rotates with respect to said pivot.

2. The router tool holder according to claim 1, wherein said biasing member includes a helical spring surrounding said spindle, a bushing coupled with said spring for compressing said spring, said bushing including a surface defining a bore contacting said rolling member and said bushing coupled with said sleeve for moving said second sleeve between a locked and unlocked position;

and a stop member for contacting said helical spring such that said helical spring compresses and expands between said stop member and said bushing.

3. A router tool holder, comprising:

a spindle adapted for coupling with a motor;

a bore in said spindle for receiving a router bit;

a sleeve surrounding said spindle; and a locking mechanism for retaining the router bit in said bore, said locking mechanism including at least one rolling member in contact with said sleeve and extending into said bore, said rolling member locking the bit in said tool holder, and a biasing member for moving said sleeve between a locked and unlocked position, said locking mechanism including an activation member remotely positioned from said sleeve, said activation member including a lever, said lever having an end in contact with said sleeve, said lever end spaced from a pivot such that said lever end rotates with respect to said pivot for moving said sleeve between said locked and unlocked positions; and a liner in said tool holder for contacting the router tool bit.

4. The router tool holder according to claim 1, wherein said lever includes a second end having a handle portion for moving said lever.

5. The router tool holder according to claim 1, wherein said actuation member having a handle portion positioned a desired distance from said sleeve so that said handle is removed from frictional heat from said router tool holder.

6. The router tool holder according to claim 1, wherein said lever has a desired length, enabling a strong spring to retain said router bit in said tool holder.

7. The router tool holder according to claim 2, wherein said locking mechanism includes a plurality of roller members and a member for registering said plurality of said roller members in the same plane.

8. A router, comprising:

a housing;

a motor in said housing;

a base member;

a support system coupled with said base member and said housing, said housing being movable on said support system toward and away from said base; and a tool holder coupled with said motor output, said tool holder including:
  a spindle adapted for coupling with a motor;
  a bore in said spindle for receiving a router bit;
  a sleeve surrounding said spindle;
  a locking mechanism for retaining the router bit in said bore, said locking mechanism including at least one rolling member in contact with said sleeve and extending into said bore, said rolling member locking the bit in said tool holder, a biasing member for moving said sleeve between a locked and unlocked position, and an activation member remotely positioned from said sleeve, said activation member including a lever, said lever having an end in contact with said sleeve, said lever end spaced from a pivot such that said lever end rotates with respect to said pivot for moving said sleeve between said locked and unlocked positions.

9. The router according to claim 8, wherein said biasing member includes a helical spring surrounding said spindle, a bushing coupled with said spring for compressing said spring, said bushing including a surface defining a bore contacting said rolling member and said bushing coupled with said sleeve for moving said second sleeve between a locked and unlocked position;

and a stop member for contacting said helical spring such that said helical spring compresses and expands between said stop member and said bushing.

10. The router tool holder according to claim 3, wherein said actuation member having a handle portion positioned a desired distance from said sleeve so that said handle is removed from frictional heat from said router tool holder.

11. The router according to claim 8, wherein said lever includes a second end having a handle portion for moving said lever.

12. The router according to claim 8, wherein said actuation member having a handle portion positioned a desired distance from said sleeve so that said handle is removed from frictional heat from said router tool holder.

13. The router according to claim 8, wherein said lever has a desired length, enabling a strong spring to retain said router bit in said tool holder.

14. The router according to claim 9, wherein said locking mechanism includes a plurality of roller members and a member for registering said plurality of said roller members in the same plane.

15. The router tool holder according to claim 3, wherein said lever has a desired length, enabling a strong spring to retain said router bit in said tool holder.

16. The router tool holder according to claim 3, wherein said biasing member includes a helical spring surrounding said spindle, a bushing coupled with said spring for compressing said spring, said bushing including a surface defining a bore contacting said rolling member and said bushing coupled with said sleeve for moving said second sleeve between a locked and unlocked position;

and a stop member for contacting said helical spring such that said helical spring compresses and expands between said stop member and said bushing.

17. The router tool holder according to claim 16, wherein said locking mechanism includes a plurality of roller members and a member for registering said plurality of said roller members in the same plane.

18. The router tool holder according to claim 3, wherein said lever includes a second end having a handle portion for moving said lever.

* * * * *